United States Patent [19]
Brüne et al.

[11] 3,970,111
[45] July 20, 1976

[54] ELECTROMAGNETIC 3-WAY VALVE ARRANGEMENT

[75] Inventors: Gerhard Brüne, Bamberg-Gaustadt; Helmut Staib, Bamberg; Heinrich Kochendörfer, Rommelshausen; Waldemar Hans, Bamberg; Walter Röpstorff, Bamberg-Gaustadt; Heinz Leiber, Leimen; Lothar Kirstein, Heidelberg, all of Germany

[73] Assignee: Robert Bosch G.m.b.H., Stuttgart, Germany

[22] Filed: Aug. 13, 1975

[21] Appl. No.: 604,500

[30] Foreign Application Priority Data
Sept. 4, 1974 Germany............................ 2442372

[52] U.S. Cl.......................... 137/627.5; 137/596.17
[51] Int. Cl.²................. F15B 13/044; F15B 13/043
[58] Field of Search...................... 137/596.17, 627.5

[56] References Cited
UNITED STATES PATENTS
3,921,666  11/1975  Leiber............................ 137/596.17

*Primary Examiner*—Alan Cohan
*Attorney, Agent, or Firm*—Edwin E. Greigg

[57] ABSTRACT

An electromagnetic 3-way valve arrangement having two valves, each controlled by a separate armature of a single coil solenoid, is described. The top end of each armature has a self-aligning closing element, and the two armatures are held apart by springs acting against an intermediate member, which also contains the valve seat for the lower armature. When deenergized, these springs act against the armatures to close the upper valve and open the lower valve. When the solenoid coil is partially energized, it moves the lower armature upward to close the lower valve also. When the solenoid coil is fully energized, it moves the upper armature downward to open the upper valve. If desired, the armature can be disposed within the solenoid so that the upper armature is operated at partial energization, and the lower armature at full energization of the solenoid coil.

10 Claims, 1 Drawing Figure

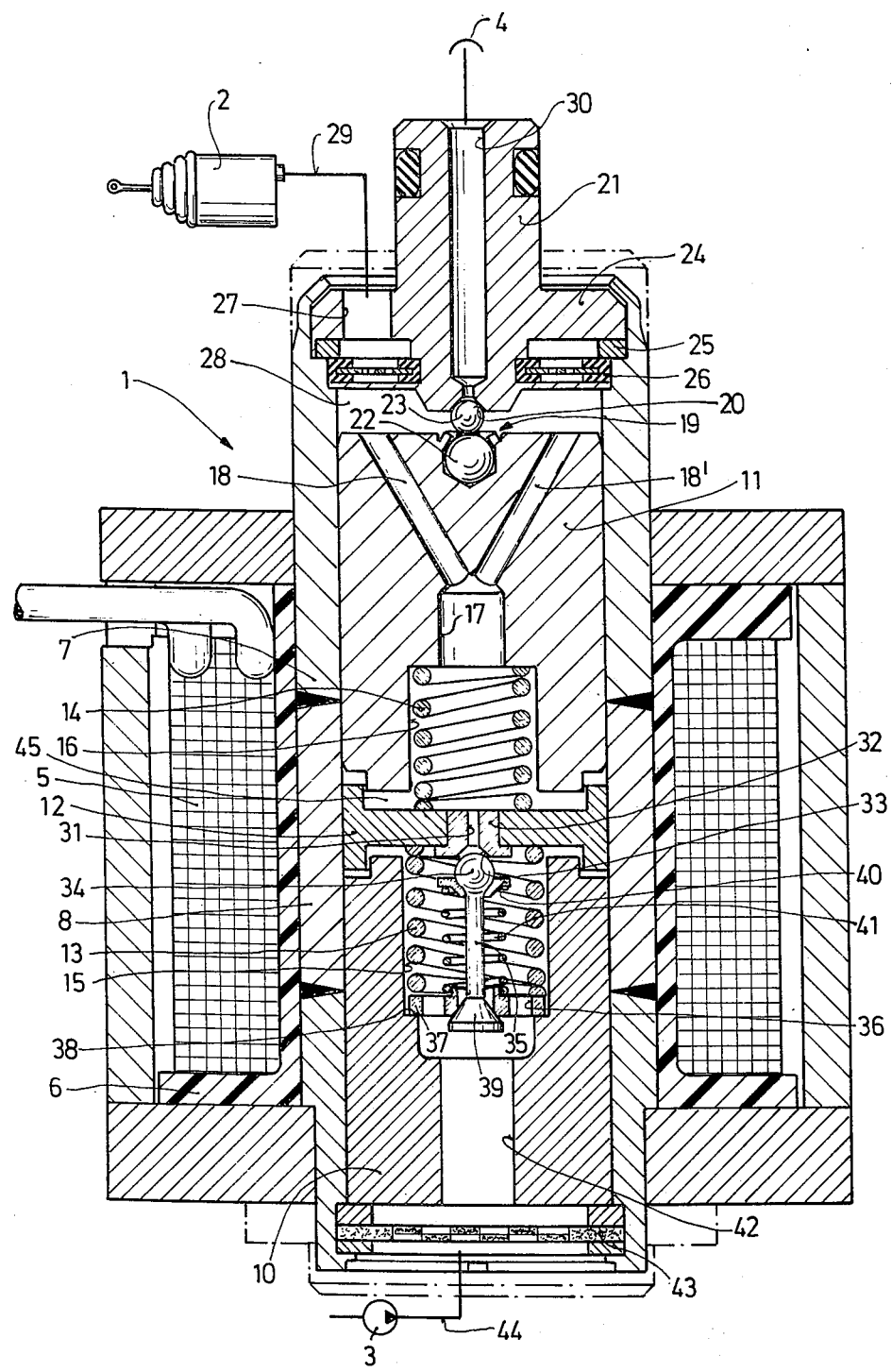

ELECTROMAGNETIC 3-WAY VALVE ARRANGEMENT

BACKGROUND OF THE INVENTION

The present invention relates to an electromagnetic 3-way valve arrangement which is disposed at the junction of a pressure receiver, a pressure source, and a pressure relief point. The arrangement comprises an inlet valve for controlling the flow of a pressure medium between the pressure source and the pressure receiver, and an outlet valve for controlling the flow of the pressure medium to the pressure relief point. It also comprises an electromagnet equipped with a single operating coil, which is excited in two stages.

In an earlier proposed valve, there is provided in the armature two closing elements which are displaceable relative to one another. Springs are used to influence these closing elements and it is necessary for the force of these springs to be accurately balanced. Under certain operating conditions, it is very difficult to achieve this accurate balancing.

OBJECT AND SUMMARY OF THE INVENTION

A principal object of the present invention is to improve the operation of the above-described 3-way valve arrangement and also to improve manufacture thereof.

According to the present invention, this object is obtained by providing two armatures for the one coil, which individually control the inlet and outlet valves, to eliminate the need for very accurately balancing the spring forces. Also, the closing elements are constructed to be self-aligning, thereby improving the operational reliability and simplifying the manufacturing process.

BRIEF DESCRIPTION OF THE DRAWING

The sole FIGURE represents a sectional front elevational view of a preferred embodiment of this electromagnetic 3-way valve arrangement.

DESCRIPTION OF THE PREFERRED EMBODIMENT

An electromagnetic 3-way valve arrangement 1 is disposed at the junction of a pressure receiver 2, a pressure source 3, and a pressure relief point 4. This 3-way valve 1 includes an electromagnetic coil 5, which is disposed on a coil support 6 mounted on a guide tube 7. The guide tube 7 includes a non-magnetic portion 8.

Two armatures 10 and 11 are disposed in the guide tube 7, one of which is designated as the inlet armature 10 and the other, as the outlet armature 11. An intermediate plate 12, on which rest two springs 13, 14, is disposed between the two armatures 10 and 11. Springs 13 and 14 are disposed in central recesses 15 and 16, respectively, formed in the armatures 10 and 11. In the outlet armature 11, a central channel 17, which divides to form two inclined channels 18 and 18', projects from the recess 16. The recess 16 and the channels 17, 18, 18' form, in the outlet armature 11, a bore which passes through the entire armature in the longitudinal direction.

The outlet armature 11 is provided with a valve closing element 19, centrally disposed on the side of the armature 11 facing toward the pressure relief point 4, between the outlets of the two inclined channels 18 and 18'. The valve seat 20 of the outlet valve 19/20 is disposed in the housing of the valve arrangement at the inner end of a connecting member 21. The valve closing element 19 consists of two spherical members 22 and 23 which are joined together, for example, by means of welding. The spherical member 22 is rotatably secured in the outlet armature 11, for example, by a flange; the other spherical member 23 forms the closing member of the outlet valve 19/20. The connecting member 21 comprises a flange 24, over which the upper end of the guide tube 7 is wrapped to attach the connecting member 21 to the guide tube 7. A spacer ring 25 and an annular filter 26 are disposed beneath the flange 24. The flange 24 includes an axial opening 27 which provides a connecting conduit between a chamber 28, disposed above the outlet armature 11, and a line 29 leading to the pressure receiver 2. A longitudinal channel 30, which passes through the center of the connecting member 21, extends from the outlet valve seat 20 to the pressure relief point 4.

The intermediate plate 12 includes an axial opening 31 which is provided in a bushing 32 secured in the intermediate plate 12. The underside of the bushing 32 is provided with a flange. The lower end of the passage 31 is formed as a valve seat 33 for an inlet valve 33/34. A closing element 34 of the inlet valve 33/34 is formed by a ball end 34 of a plunger 35 which is disposed within the spring 13 in the following manner: beneath the spring 13 is a disk 37 provided with axial openings 36. The disk 37 is held by the spring 13 against an armature shoulder 38. The lower portion of plunger 35 extends through a centrally disposed axial opening in the disk 37, and terminates in a conical foot 39, which limits the upward movement of the plunger 35 relative to the disk 37. A spring plate 40 is disposed beneath the ball end closing element 34 and is pressed upwards by a spring 41, which is supported on the disk 37. Consequently, the valve closing element 34 is axially and flexibly mounted within the spring 13.

The recess 15 in the inlet armature 10 opens into a channel 42 which extends to the bottom side of the armature 10. Thus the inlet armature 10 has a longitudinal passage extending its entire length. Beneath the inlet armature 10 is an annular filter 43 and beneath this annular filter 43, there is connected a pressure line 44 running from the pressure source. It is apparent from this specification that the two armatures 10 and 11 are disposed in a central chamber 45 which is filled with a pressure medium and which is connected to the line 29 leading to the pressure receiver 2.

The above-described valve arrangement operates in the following manner:

In the normal de-energized position of the movable parts of the valve arrangement, as shown in the drawing, the passage from the pressure source 3 as to the pressure receiver 2 is open and the passage to the relief point 4 is blocked. The inlet valve 33/34 is open and the outlet valve 19/20 is closed.

When the coil 5 is partially excited, at approximately half its nominal current rating (excitation stage 1), the inlet armature 10 moves upwards against the force of the spring 13 and the inlet valve 33/34 closes. If, in the case of a particular application it should be necessary to relieve some of the pressure at the pressure receiver 2, when the valves 33/34 and 19/20 are in this position, the pressure in the pressure receiver 2 can be reduced as far as the pressure of the pressure source 3 by means of the inlet valve 33/34, which acts as a check valve. This type of application is provided, for example, in the case of blocking safety systems for the brakes of vehicles.

When the coil is fully excited (excitation stage 2), the outlet armature 11 is moved downwards against the force of the spring 14. The outlet valve 19/20 opens and the pressure in the pressure receiver 2 is relieved as far as the relief point 4.

It is also possible to design the circuit in such a way that the outlet armature 11 is switched in the first excitation stage and the inlet armature 10 in the second excitation stage.

In either case, some of the design choices which determine which armature is switched in the first excitation stage include the position of the coil 5 and the non-magnetic portion 8 relative to the normal positions of the two armatures 10, 11, the force exerted by the spring 14 on the armature 11, in comparison to the force exerted on armature 10 by the spring 13, the magnetic materials chosen for the armatures 10, 11, and the shape and configuration of coil 5 and armatures 10, 11.

The two closing elements 34 and 19 of the two valves 33/34 and 19/20 are automatically adjustable by virtue of the manner in which they are mounted on their seats 33 or 20. In this way, any misalignments are compensated and reliable closures at the seats 33 or 20 are obtained. The reliability is still further improved in that by virtue of the two-armature construction, the closing operation at the inlet seat 33 is completely disconnected mechanically from the closing operation at the outlet seat 20.

What is claimed is:

1. In an electromagnetic 3-way valve arrangement for controlling the flow of a pressure medium between a pressure source and a pressure receiver, and between the pressure receiver and a pressure relief point, the arrangement comprising:
   inlet conduit means for connecting the valve arrangement to the pressure source;
   outlet conduit means for connecting the valve arrangement to the pressure receiver;
   relief outlet conduit means for connecting the outlet conduit means to the pressure relief point;
   inlet valve means for controlling flow of the pressure medium through the inlet conduit means; and
   outlet valve means for controlling flow of the pressure medium through the relief outlet conduit means, the improvement comprising:
   inlet armature means for controlling the inlet valve means, said inlet armature means including an inlet armature capable of limited movement between an energized and a de-energized position;
   outlet armature means for controlling the outlet valve means, said outlet armature means including an outlet armature capable of limited movement between an energized and a de-energized position; and
   a magnetic coil energizable in two stages, said coil causing one of said armatures to assume its energized position when the coil is energized at a first stage of excitation, and causing the other of said armatures to assume its energized position while said one of said armatures is maintained in its energized position when the coil is energized at a second stage of excitation.

2. The valve arrangement as defined in claim 1, wherein the inlet armature assumes its energized position when the coil is energized at its first stage of excitation, and the outlet armature assumes its energized position when the coil is energized at its second stage of excitation.

3. The valve arrangement as defined in claim 1, wherein the outlet armature assumes its energized position when the coil is energized at its first stage of excitation, and the inlet armature assumes its energized position when the coil is energized at its second stage of excitation.

4. The valve arrangement as defined in claim 1, wherein the improvement further comprises an intermediate plate disposed between said inlet and outlet armature, and wherein said inlet and outlet armature means each further comprise a spring disposed between said intermediate plate and the respective armature of said inlet and outlet armature means, said springs exerting a force to press apart said inlet and outlet armatures.

5. The arrangement as defined in claim 4, wherein said intermediate plate is provided with an axial opening which provides a passage for the flow of the pressure medium through the intermediate plate, and wherein one end of said axial opening forms a valve seat for said inlet valve means.

6. The arrangement as defined in claim 1, wherein each said armature is provided with at least one channel which extends generally longitudinally through the armature and provides a passage for the flow of the pressure medium through the armature.

7. The valve arrangement as defined in claim 1, wherein said inlet valve means includes an inlet valve closing element, which is axially flexibly mounted to said inlet armature by spring means.

8. The valve arrangement as defined in claim 7, wherein said inlet valve means comprises a check valve when said inlet armature is energized, said check valve opening in the direction of said pressure source, and said inlet valve closing element constitutes the closing element of said check valve.

9. The valve arrangement as defined in claim 1, wherein said outlet valve means includes an outlet valve closing element that is pivotably mounted in said outlet armature, and an outlet valve seat, and wherein said relief outlet conduit means includes a connecting member in which said outlet valve seat is formed.

10. The valve arrangement as defined in claim 9, wherein said outlet valve closing element comprises two spherical members which are attached to one another, in which one spherical member is mounted for limited rotation in said outlet armature, and the other spherical member is a closing member of said outlet valve.

* * * * *